United States Patent [19]

Couch et al.

[11] Patent Number: 5,781,180

[45] Date of Patent: Jul. 14, 1998

[54] CONVERTIBLE PERIPHERAL DEVICE

[75] Inventors: Johnny D. Couch, Redwood City; Sarah Mason Richmond, Foster City; Ira L. Velinsky, Saratoga, all of Calif.; Steven Kevin Guerrera, Millford, Mass.; Gregory Hunter, Westwood, Mass.; John Gundlach, Rowley, Mass.; Masanori Kudou, Kawasaki, Japan

[73] Assignee: Sega of America, Inc., Redwood City, Calif.

[21] Appl. No.: 749,080

[22] Filed: Nov. 14, 1996

Related U.S. Application Data

[63] Continuation of Ser. No. 455,055, May 31, 1995, abandoned, which is a continuation-in-part of Ser. No. 36,218, Mar. 15, 1995, Pat. No. Des. 376,392, and a continuation-in-part of Ser. No. 36,221, Mar. 15, 1995, Pat. No. Des. 378,931, and a continuation-in-part of Ser. No. 36,205, Mar. 15, 1995, Pat. No. Des. 378,768, and a continuation-in-part of Ser. No. 36,220, Mar. 15, 1995, Pat. No. Des. 369,835, and a continuation-in-part of Ser. No. 36,219, Mar. 15, 1995, Pat. No. Des. 370,941.

[51] Int. Cl.$^6$ ............................................ G09G 5/08
[52] U.S. Cl. ............................. 345/161; 273/148 B
[58] Field of Search ..................... 345/161, 163, 345/167, 168, 157, 156, 160; 74/471 XY; 273/148 B, 433–438; D14/114, 115, 218; D21/1, 13, 48; 341/20

[56] References Cited

U.S. PATENT DOCUMENTS

| D. 317,153 | 5/1991 | MacKenzie | D14/114 |
|---|---|---|---|
| D. 345,994 | 4/1994 | Shian | D21/48 |
| D. 351,625 | 10/1994 | Carter et al. | D21/48 |
| D. 352,331 | 11/1994 | Wu | D21/48 |
| 4,509,383 | 4/1985 | Yeh | 74/471 XY |
| 4,668,443 | 5/1987 | Fabre et al. | 74/469 |
| 4,739,451 | 4/1988 | Kuba | D14/115 |
| 5,114,157 | 5/1992 | Kita | 273/434 |
| 5,267,181 | 11/1993 | George | D14/115 |
| 5,375,831 | 12/1994 | Hsien-Chung | 273/148 B |

OTHER PUBLICATIONS

A copy of an advertisment for different joysticks by the Wico Corporation. Mar. 1983, p. 53.
A copy of an advertisement for a joystick used by the game "TRON" by Bally Midway. Jul. 1982, p. 40.
A copy of an advertisement for two joysticks designed and manufactured by the Peak Tone Company. Undated.

Primary Examiner—Regina Liang
Attorney, Agent, or Firm—Dergosits & Noah LLP

[57] ABSTRACT

A convertible peripheral input device comprises a control pad and a multiaxis input device selectably mounted on the edges of the control pad so that the multiaxis input device can be positioned for right-handed use or left-handed use according to the user's preference. The multiaxis input device can be rotated from one position to another by the use of a hinge mechanism with two points of rotation: one for rotation of the multiaxis input device 180 degrees relative to the hinge mechanism and the second point of rotation allowing the hinge mechanism to be rotated 180 degrees relative to the control pad bottom surface. The rotatable hinge mechanism may be used with videogame control pads and joysticks as well as keyboards with mouse controllers.

18 Claims, 11 Drawing Sheets

CONVERTIBLE PERIPHERAL DEVICE

This is a continuation of U.S. Pat. application Ser. No. 08/455,055, filed May 31, 1995, now abandoned which is a continuation-in-part of U.S. patent application Ser. Nos. 29/036,218, now U.S. Pat. No. D376392, 29/036,221; now U.S. Pat. No. D378931, and 29/036,205 now U.S. Pat. No. D378768 each of which were filed on Mar. 15, 1995; U.S. patent application. Ser. No. 29/036,220 filed on Mar. 15, 1995, now U.S. Pat. No. D369,835; and U.S. patent application Ser. No. 29/036,219 filed on Mar. 15, 1995, now U.S. Pat. No. D370,941.

TECHNICAL FIELD

The present invention relates generally to the use of peripheral input devices for use with computers, including videogame consoles. More specifically, this invention relates to the use of a hinge mechanism which permits conversion of a peripheral device from right-handed use to left-handed use.

RELATED APPLICATION DATA

U.S. patent application Ser. No. 08/454,609 filed on May 31, 1996 entitled A PERIPHERAL INPUT DEVICE WITH SIX-AXIS CAPABILITY is a related utility patent application, hereby incorporated by reference.

BACKGROUND OF THE INVENTION

There are a large variety of computer input devices which can be used alone or in combination with other peripheral input devices. A common example is the use of a joystick and control pad with a raster-based computer game. Another is the use of a keyboard and mouse controller during operation of a personal computer. When these devices are used in combination, they are arranged in the favor of the user's orientation and preference. Some users prefer to use the mouse controller on the right hand side of the keyboard. Other users prefer it to be located to the left of the keypad. The physical attachment of the two peripheral input devices, or even the decision to attach them to each other at all, represents a significant choice. Moreover, the original positioning may make the combination of devices ergonomically difficult. It would therefore be desirable to provide a system of combining peripheral input devices which can be easily and routinely convertible from right-handed use to left-handed use, and back to the original configuration.

SUMMARY OF THE INVENTION

These and other objects are achieved according to the present invention which provides a hinge mechanism which allows a multiaxis peripheral device to be selectively rotated from one position used for right-handed operators to a second position on the opposite side of the control pad peripheral device convenient for left-handed users. The hinge member has two points of rotation. The first is on the bottom surface of the control pad device. This rotation point allows the hinge mechanism to rotate from one side of the control pad to the other, operating in a semicircular arch with the bottom surface of the control pad acting as the diameter of the arch. The second rotation point for the hinge mechanism is located at the bottom surface of the multiaxis peripheral device. This rotation point allows the multiaxis peripheral device to rotate 180 degrees relative to the plane of the control pad bottom surface. Based upon these two rotational degrees of freedom, the hinge mechanism allows the multiaxis input device to be moved from one side of the control pad to the other without having to completely disconnect the multiaxis device from the control pad.

Several embodiments are described, the major variant between the embodiments being the manner in which the control pad and the multiaxis input device are rotatably connected to the hinge mechanism.

DETAILED DESCRIPTION OF THE INVENTION

The present invention is described below with reference to a convertible peripheral input device available for use with the Sega Saturn™ Videogame System. The purpose of this description with reference to a particularly preferred embodiment is to illustrate the present invention, and it is not intended to limit the scope of the claims appended hereto. Moreover, while the invention is described with reference to ajoystick and control pad for use with a videogame console, it is understood that the term peripheral input device and control pad are used more broadly than as used in connection with the preferred embodiment. For example, instead of ajoystick and control pad, the hinge mechanism of the present invention could be used to rotate a mouse controller (a multiaxis input device) from one side of a keyboard (control pad) to the other side of the keyboard.

Figure 1:
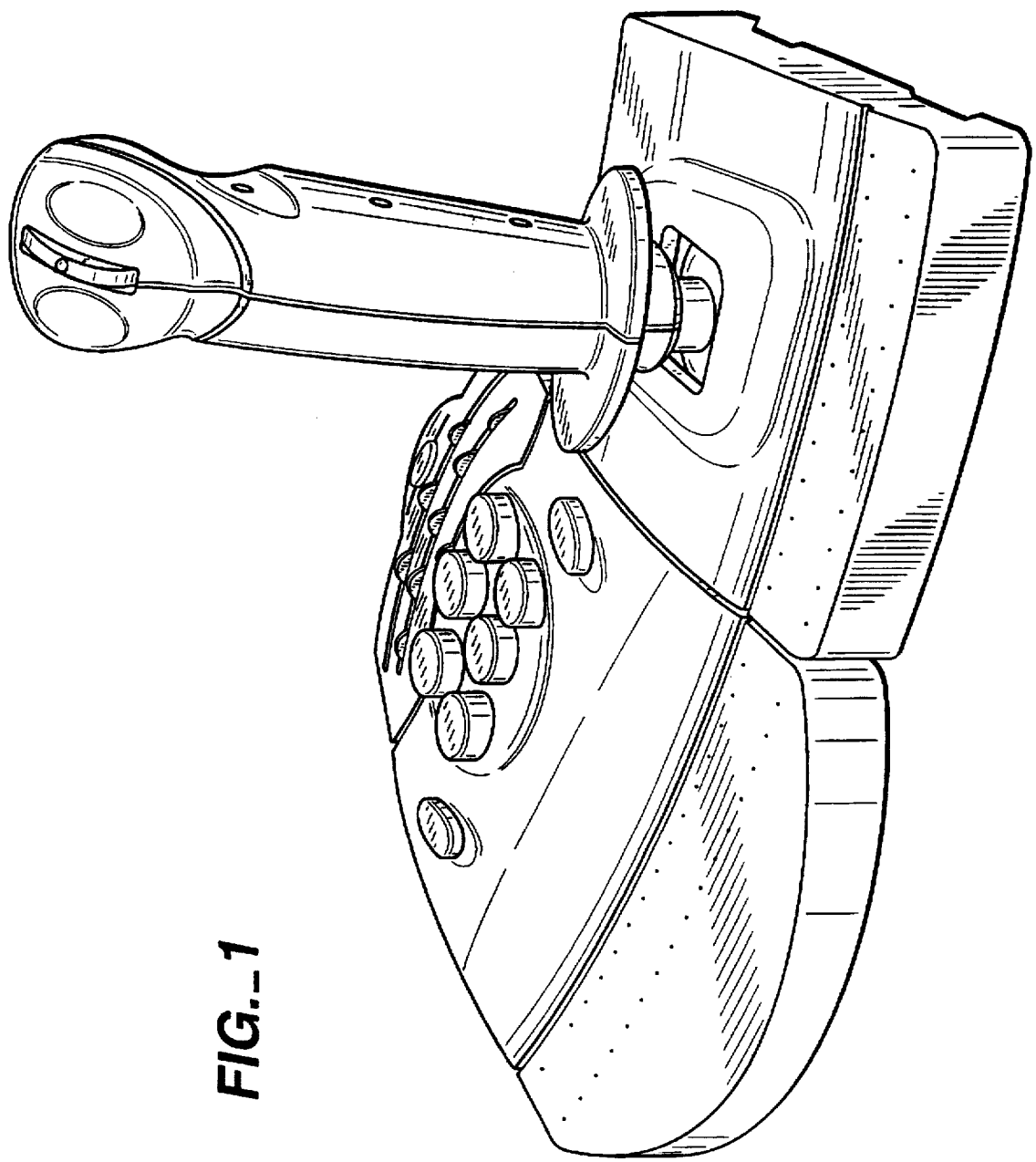
FIG. 1 is a perspective view of the control pad with a three-axis joystick positioned for use on the left side of the control pad.
Figure 2:
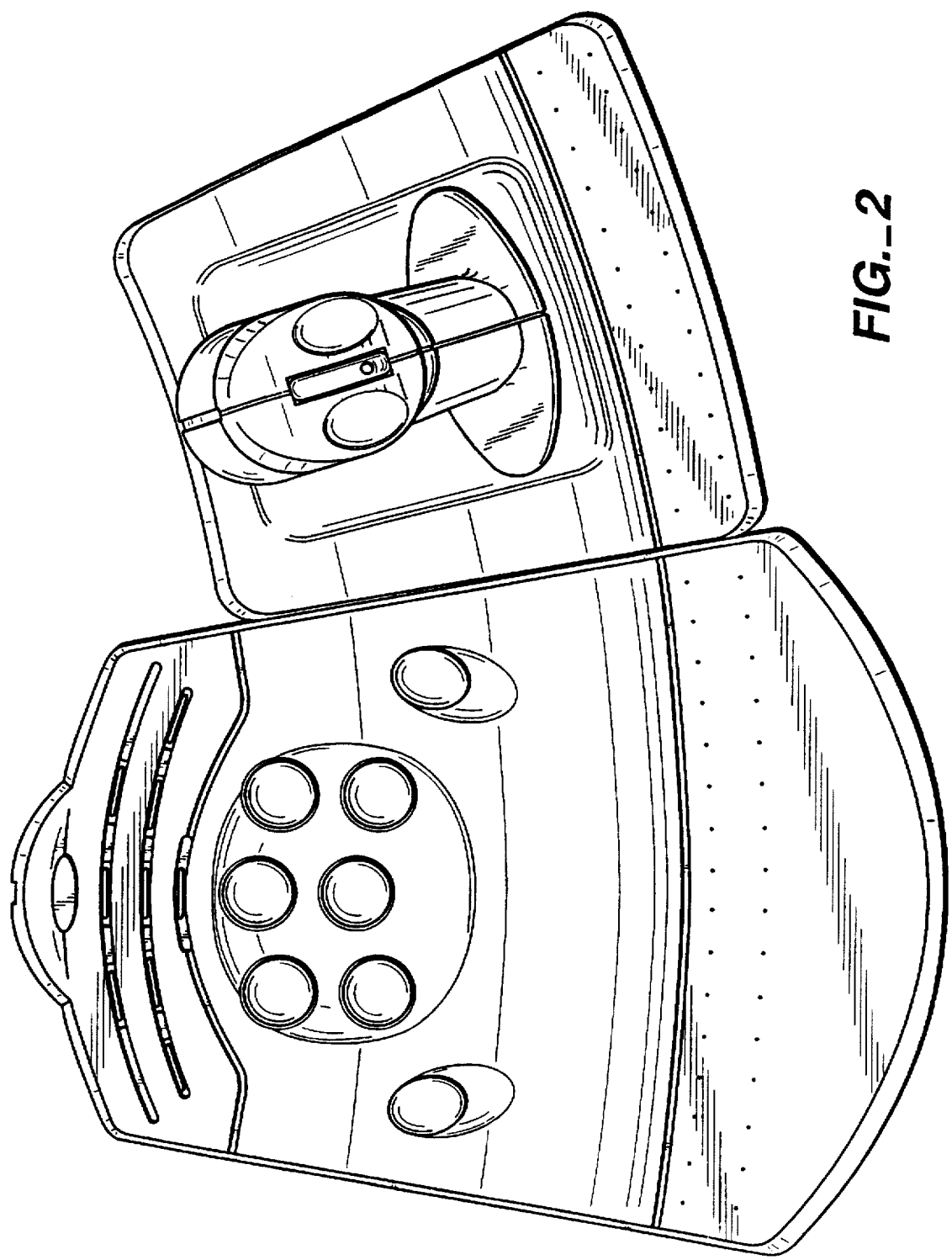
FIG. 2 is a top plan view of the control pad with a three-axis joystick positioned for use on the left side of the control pad.
Figure 3:
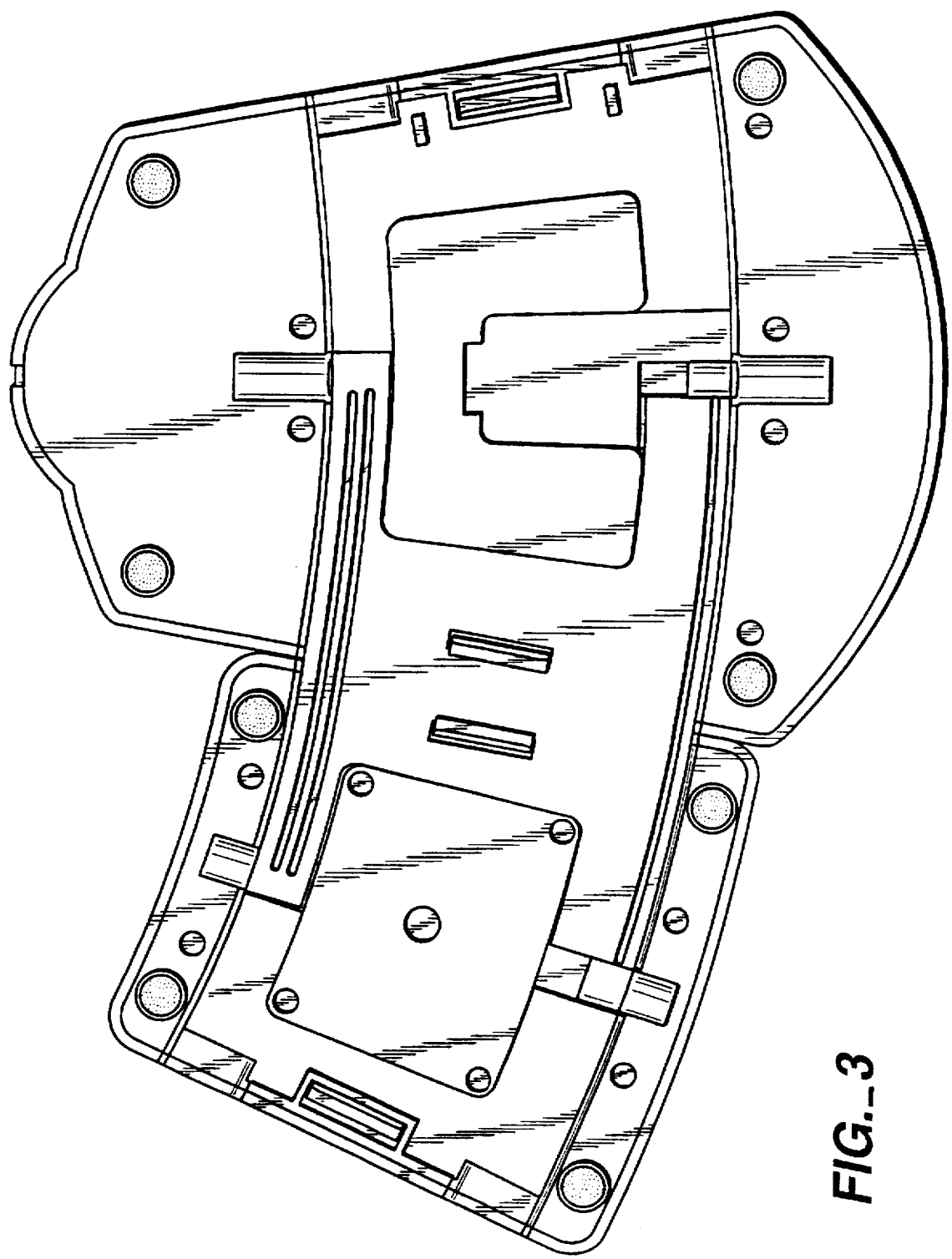
FIG. 3 is a bottom plan view of the control pad with a three-axis joystick positioned for use on the left side of the control pad.
Figure 4:
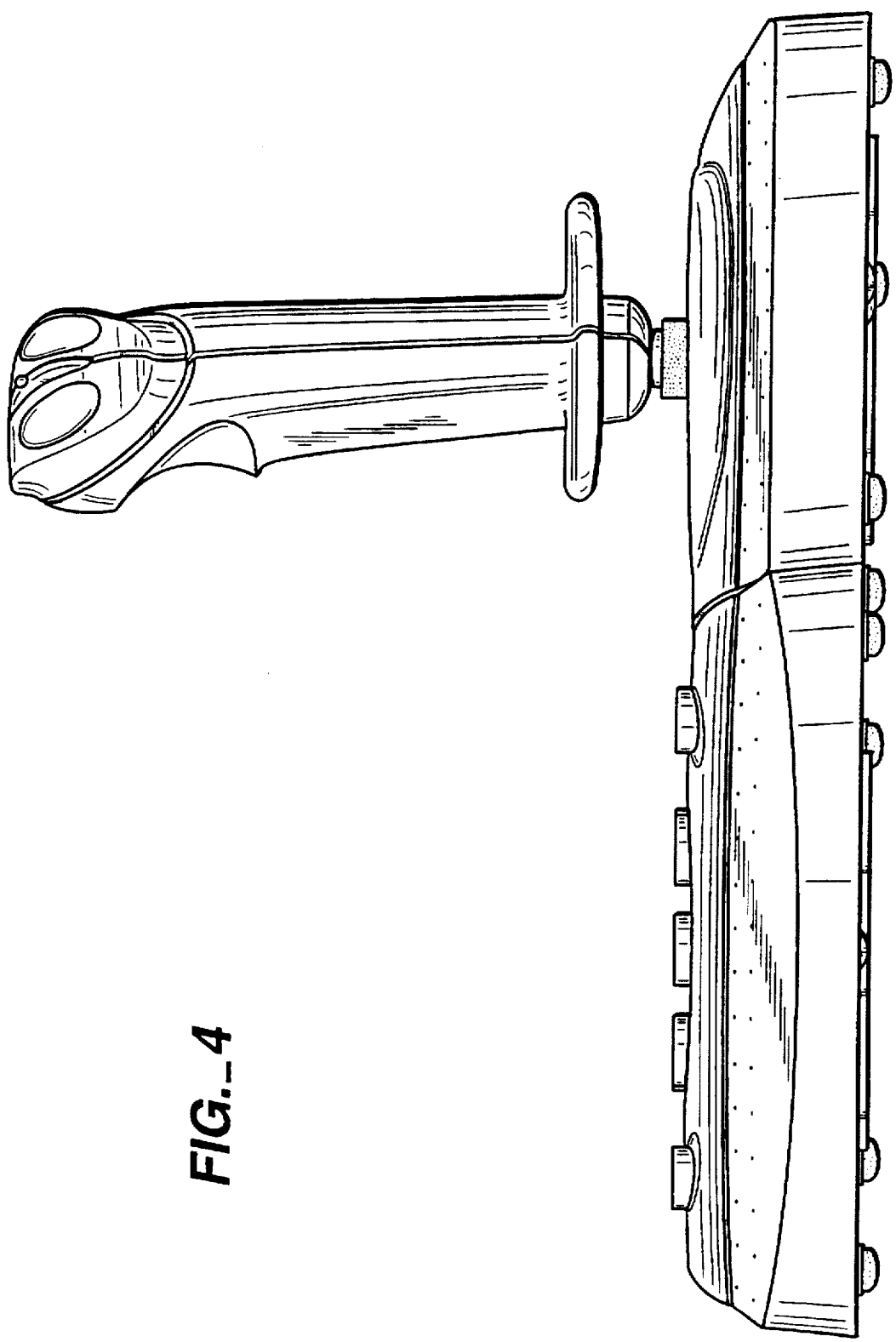
FIG. 4 is a side elevation of the control pad with a three-axis joystick positioned for use on the left side of the control pad.
Figure 5:
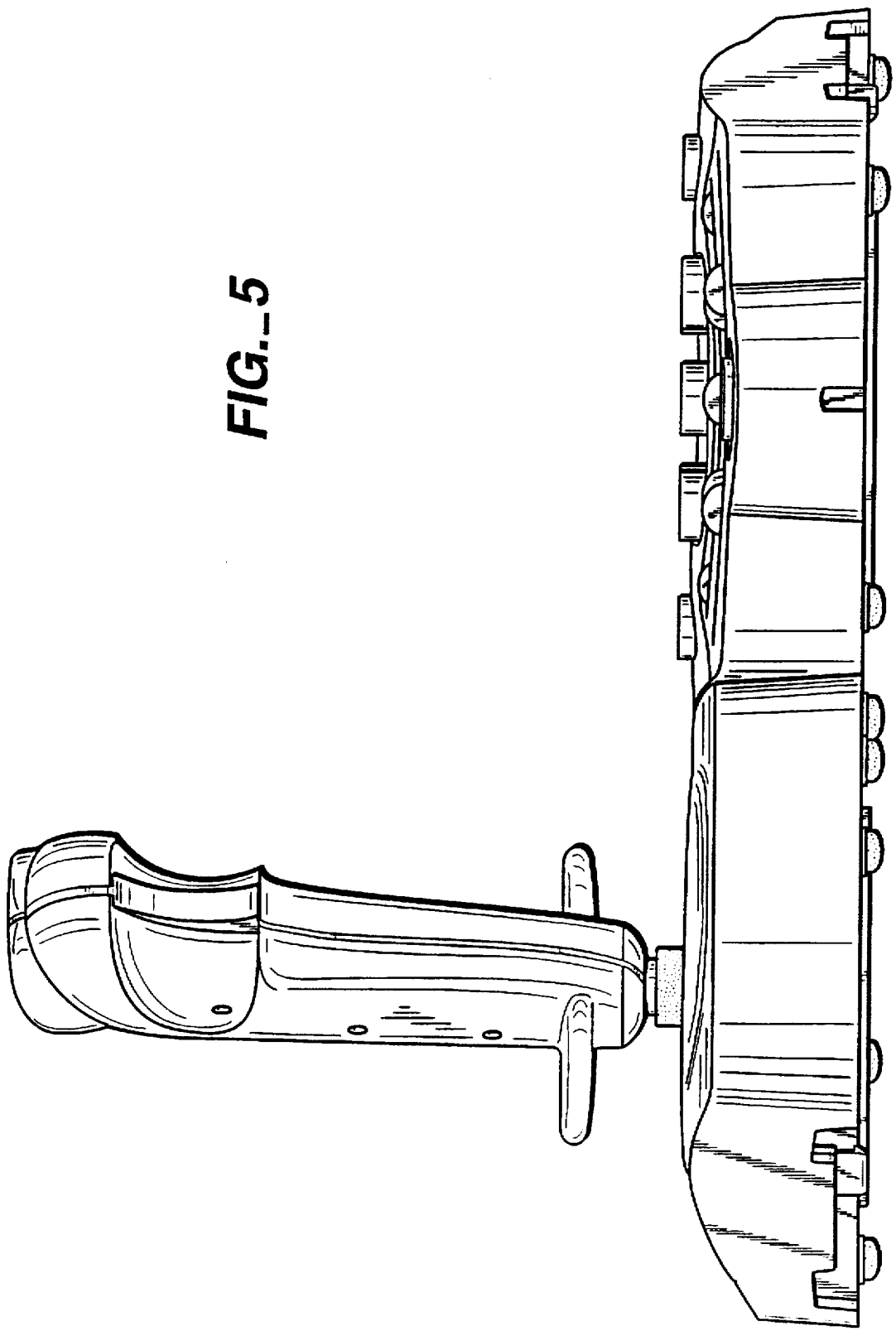
FIG. 5 is a side elevation of the control pad with a three-axis joystick positioned for use on the left side of the control pad.

In FIG. 1, a convertible peripheral input device 10 is shown comprising a control pad 12 and a three-axis joystick 14. The control pad has buttons or keys for inputting various data to the videogame console. The joystick has a thumb-operated z-axis controller 18. The two devices are joined along the control pad body edge 20 and the joystick base edge 22. FIGS. 2–5 show the relationship between these same elements in different views.

Figure 6:
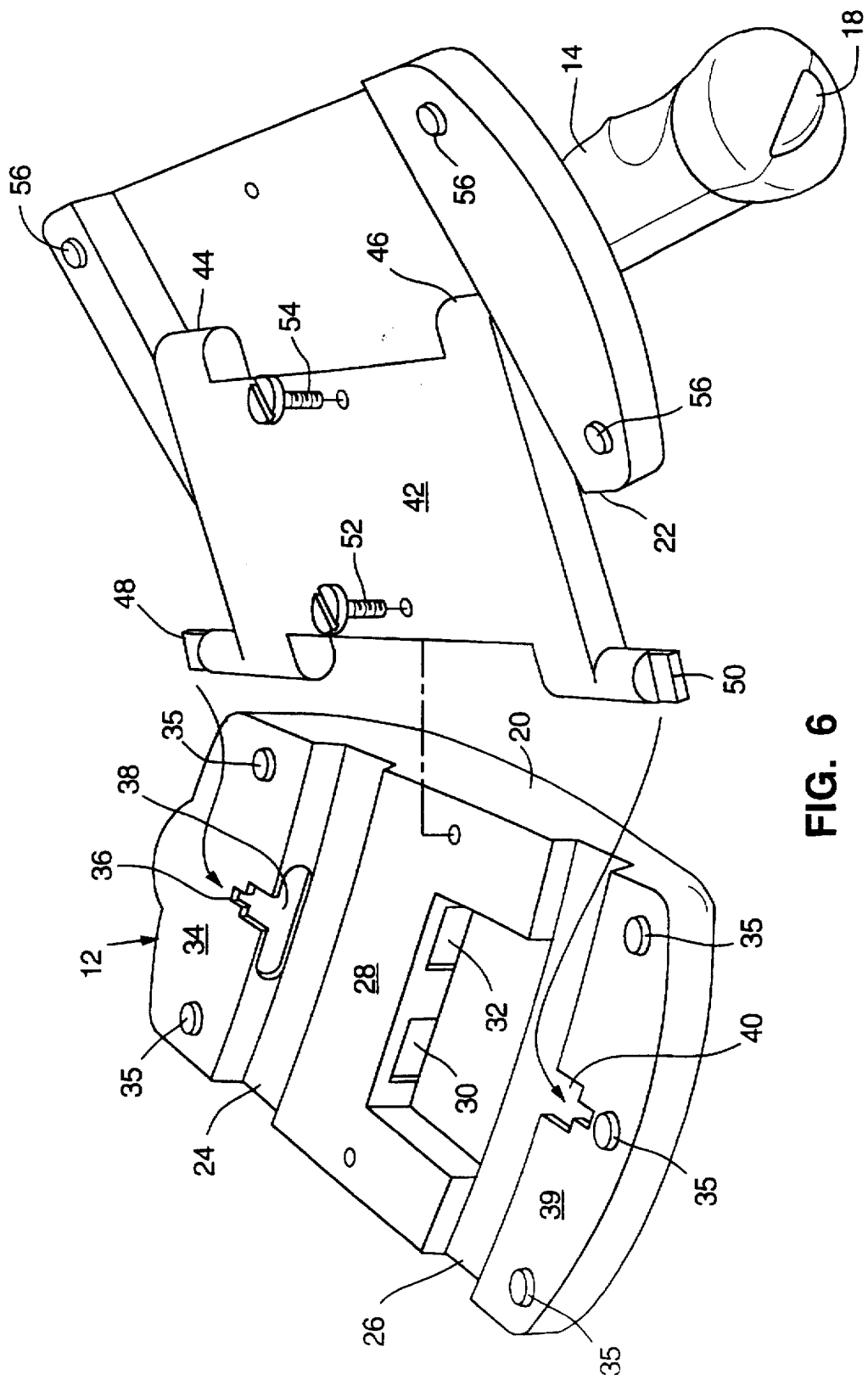
FIG. 6 is a perspective view of the bottom surface of the control pad, the bottom surface of the joystick base and the hinge device.

FIG. 6 provides an exploded perspective view in which the hinge mechanism is clearly seen. The bottom surface of the control pad 12 has a first channel 24 and second channel 26, which each run substantially perpendicular to the control pad body edge 20 and substantially parallel to each other. These channels 24 and 26 may be slightly curved depending on the angle of the control pad body edge 20. The bottom surface also has an input port protector 28 which provides the space necessary for first input port 30 and second input port 32. In the preferred embodiment, used with the Sega Saturn™ videogame console, it is possible to connect two three-axis joysticks to the control pad which contains a microprocessor. Adjacent the input port protector 28, on either side of channels 24 and 26 respectively, there is a first raised portion 34 and a second raised portion 39. Stabilizers 35, in the nature of rubber disks, are provided on the first and second raised portions to insure that the control pad rests stably and flatly on the playing surface. The first and second raised surfaces 34 and 39 are preferably of greater height than the input port protector 28, although this is not essential.

On one of the sidewalls defining the first channel 24, there is a slot-shaped aperture 36. On the first raised portion 34 there is a notch 38 which is continuous with the slot-shaped aperture 36. Another notch 40 is seen in the second raised portion 39. These apertures/notches cooperate with protrusions extending out from the hinge mechanism 42.

As discussed above, the hinge mechanism has two points of rotation. In this embodiment, the hinge mechanism is rotatably fixed to the joystick base by coupling mechanism 44 and 46. The coupling mechanism can consist of either protrusions in the joystick base sidewalls mating with apertures in the hinge mechanism, or it can be reversed, where the protrusions extend out from the hinge mechanism for mating with apertures in the joystick base sidewall. At the other end of the hinge mechanism is the second point of rotation, under the control pad. In the presently preferred embodiment the hinge mechanism has first and second hinge protrusions 48 and 50, respectively. In this embodiment, the protrusions 48 and 50 mate with aperture/notches 36/38 and 40, respectively, to provide the second point of rotation. The slotted aperture/notch approach permits the hinge mechanism/joystick to be completely removed from the control pad, when they are not wanted. The bottom surface of the joystick base is also provided with stabilizers 56.

Screws 52 and 54 are used to more securely fasten the hinge mechanism to the control pad and the joystick base.

Figure 7A:
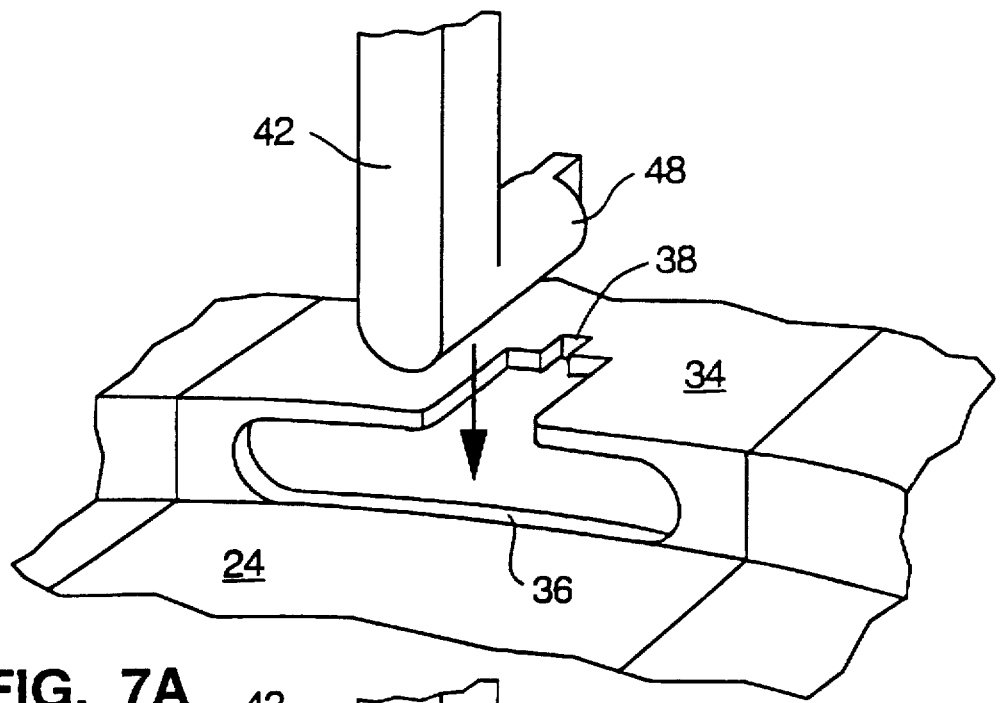
FIG. 7 is a detailed perspective view of the hinge mechanism being installed on the control pad bottom surface.
Figure 7B:
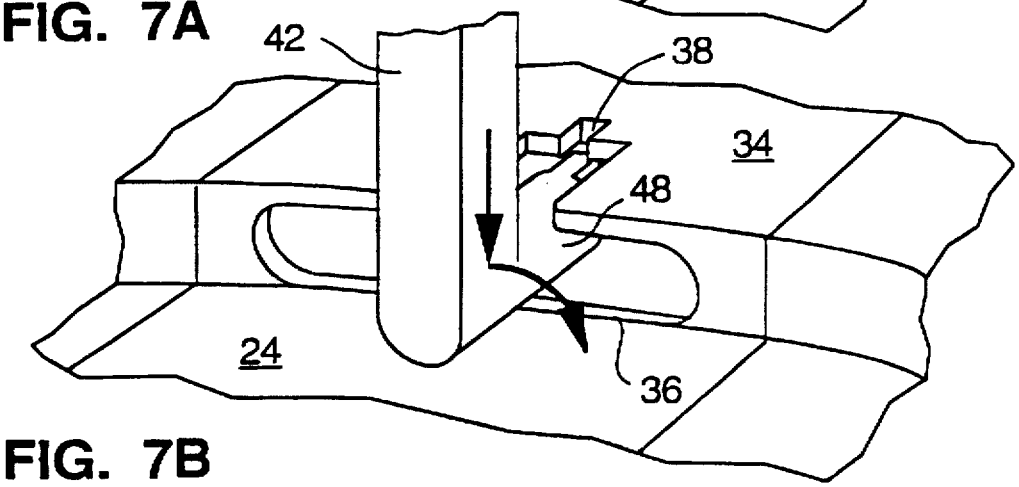
Figure 7C:
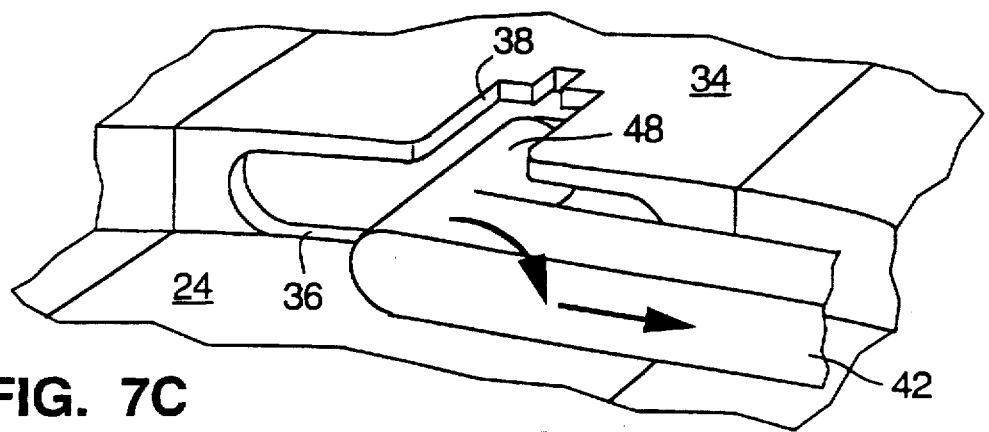
Figure 7D:
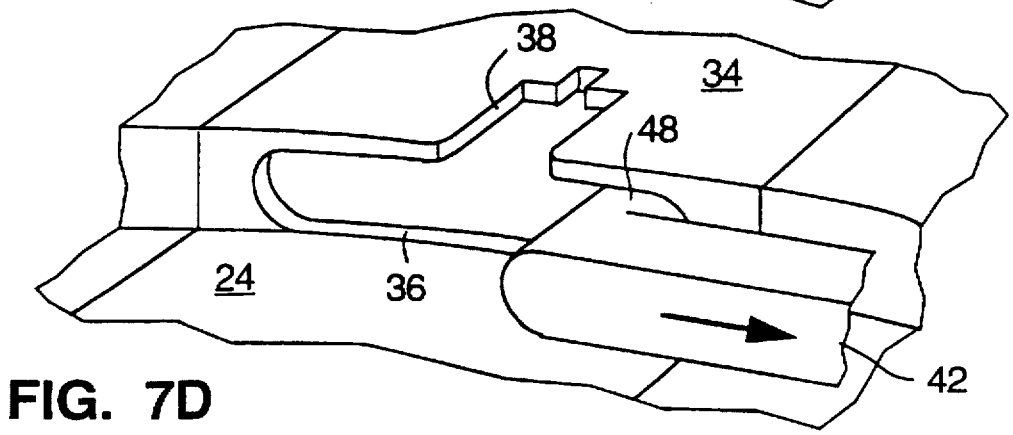

FIGS. 7A through 7D show the sequence of positions used in the installation of the hinge mechanism into the control pad aperture/notch. FIG. 7A shows the hinge mechanism 42 in a position substantially perpendicular to the control pad bottom surface. First hinge protrusion 48 has a rectangular raised portion which is adapted to be received within the notch 38, allowing the hinge mechanism to be lowered into the first channel 24 so that the cylindrical portion of the first protrusion 48 is aligned with the slotted aperture 36. FIG. 7B shows the hinge mechanism being lowered into position within the slotted aperture 36. The arrow shows that the general direction of movement in FIGS. 7A and 7B is down. In FIG. 7C, the hinge mechanism is rotated from the 12 o'clock position to the three o'clock position. This rotation causes the rectangular raised portion of protrusion 48 to be locked within the notch 38 because the notch is dimensioned to receive the rectangular raised portion when it is vertical and not when it is horizontal. Once the protrusion is secured within the notch, the protrusion 48 can be pulled in the direction of the arrow in FIG. 7D to position the hinge mechanism and multiaxis input device to be secured along adjacent edges 20 and 22.

Figure 8:
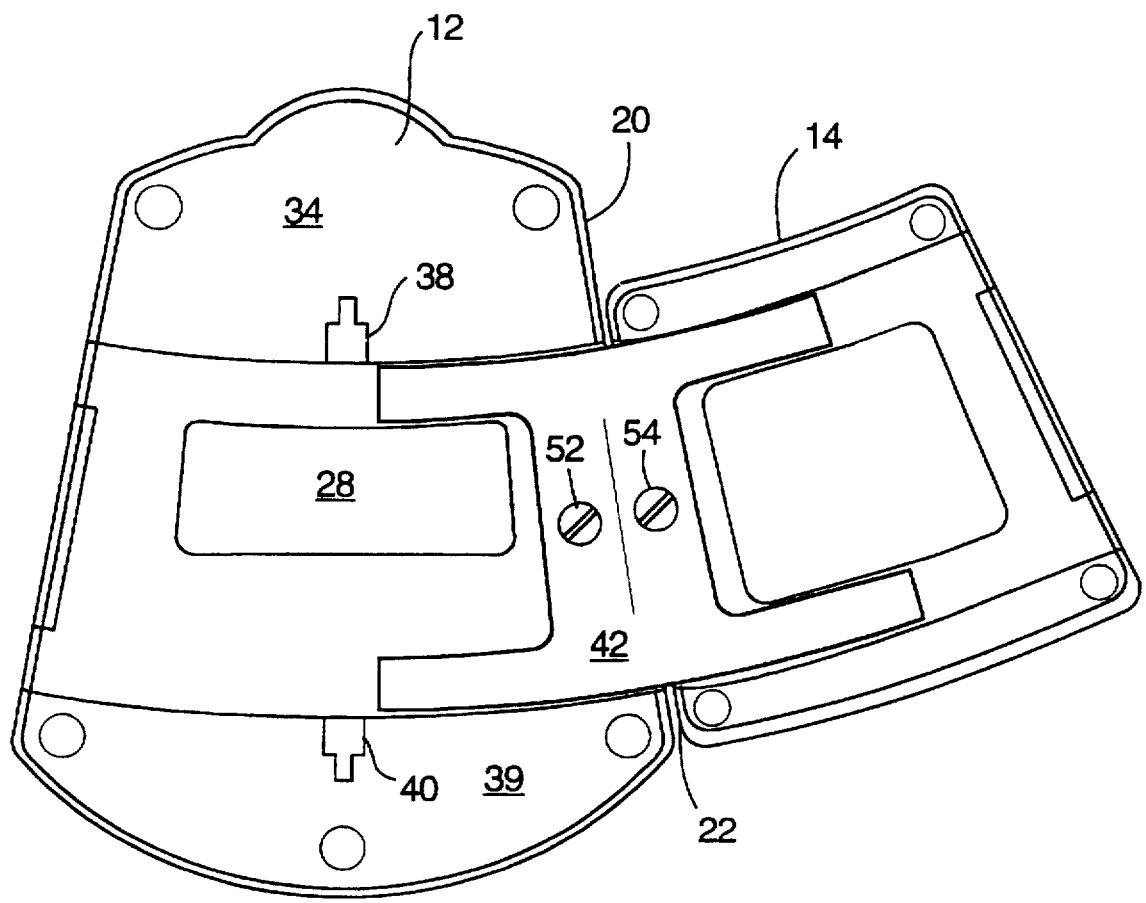
FIG. 8 is a bottom plan view of the control pad, joystick base and the hinge mechanism.

The final assembly is shown in FIG. 8. In this view, the hinge mechanism 42 secures the joystick base 14 along the control pad edge 20 and screws 52 and 54 are in place to secure the two devices relative to each other. FIG. 8 also provides a good view for describing how the joystick could be rotated from its place along the control pad edge 20 to a position on the opposite side of the control pad. Once screws 52 and 54 are removed, the hinge mechanism 42 can be rotated 180 degrees about the slotted aperture/notch 38 and 40. This rotation would cause the joystick to facing down, 180 degrees out of phase from the desired operating position. Thus, the joystick is rotated 180 degrees about the joystick coupling to cause the joystick to face upward. In this manner, the convertible peripheral device is changed from a control pad with a joystick in the left-handed operating position to a control pad with a joystick in the right-handed operating position. Screws 52 and 54 can be used to secure the two devices in this configuration, if desired.

Figure 9:
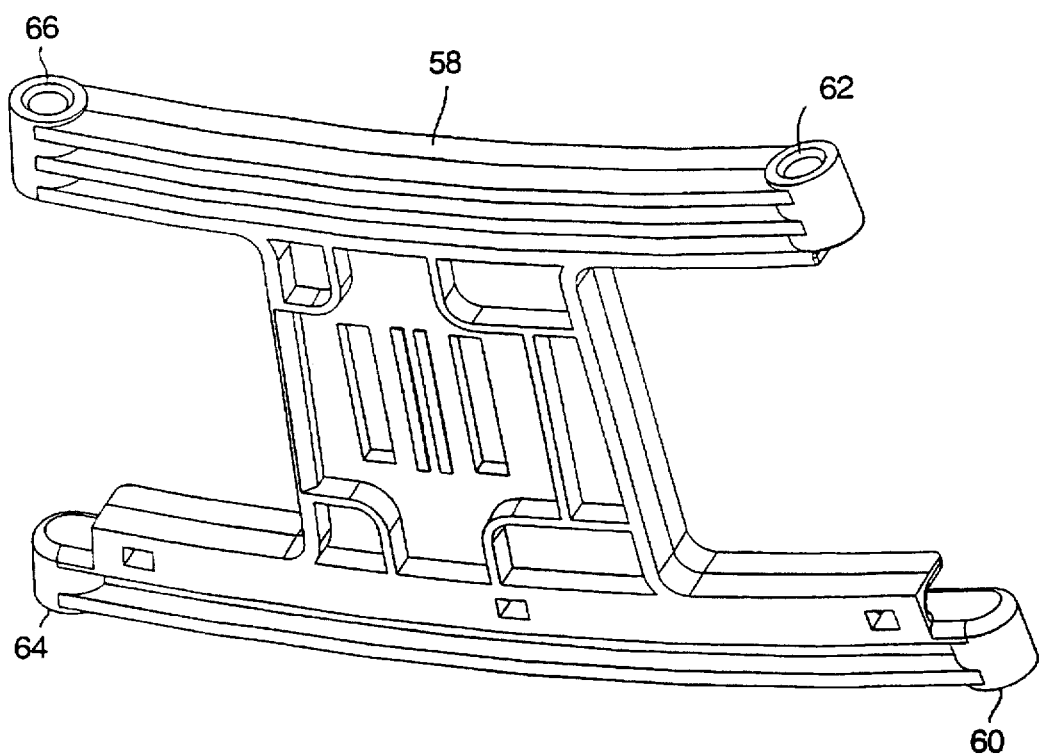
FIG. 9 is a perspective view of another embodiment of the hinge mechanism according to the present invention.
Figure 10:
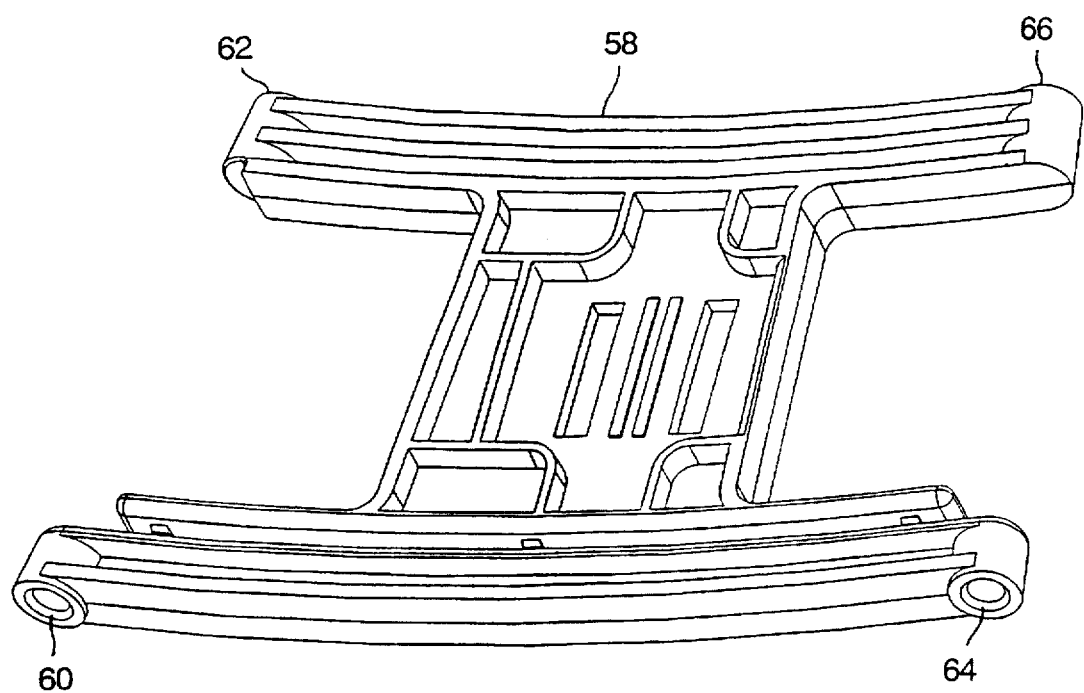
FIG. 10 is another perspective view of the hinge mechanism according to the present invention.

FIG. 9 and 10 show an alternate embodiment of the hinge mechanism 58 in which the hinge mechanism has apertures at 60, 62, 64 and 66 for connection to corresponding protrusions in the lower surfaces of the control pad and joystick. This configuration also provides for two points of rotation to enable the multiaxis input device to be rotated from one edge of the control pad to the opposite edge. This embodiment does not necessarily employ screws to fasten the hinge mechanism 58 to the control pad and the joystick base.

While the present invention has been described with reference to preferred embodiments, those of ordinary skill in the art will recognize that variations in the design are possible without deviating from the spirit of the invention or from the scope of the appended claims.

We claim:

1. A convertible peripheral input device which comprises:

a) a control pad with an upper and lower surface and left and right edges having at least one aperture in the lower surface;

b) a multiaxis input device with an upper and a lower surface and with at least one aperture in the lower surface;

c) a hinge member with a first protrusion adapted for insertion into the control pad aperture and a second protrusion adapted for insertion into the multiaxis input device aperture;

wherein the hinge member is selectively and rotatably disposed between the control pad and the multiaxis input device such that the multiaxis input device can be rotated from a position adjacent the control pad right edge to a position adjacent the control pad left edge.

2. A convertible peripheral input device according to claim 1 wherein the hinge member further comprises a third protrusion adapted for insertion into a control pad aperture and a fourth protrusion adapted for insertion into a multiaxis input device aperture.

3. A convertible peripheral input device according to claim 1 wherein the multiaxis input device is a joystick.

4. A convertible peripheral input device according to claim 1 wherein the multiaxis input device is a trackball.

5. A convertible peripheral input device according to claim 1 wherein the multiaxis input device is a mouse controller.

6. A convertible peripheral input device according to claim 1 wherein the hinge member further comprises a securing device to fixedly secure the hinge member to the control pad lower surface.

7. A convertible peripheral input device which comprises:

a) a control pad with an upper and lower surface and left and right edges having at least one protrusion in the lower surface;

b) a multiaxis input device with an upper and a lower surface and with at least one protrusion in the lower surface;

c) a hinge member with a first aperture adapted for receiving the control pad protrusion and a second aperture adapted for receiving the multiaxis input device protrusion;

wherein the hinge member is selectively and rotatably disposed between the control pad and the multiaxis input device such that the multiaxis input device can be rotated from a position adjacent the control pad right edge to a position adjacent the control pad left edge.

8. A convertible peripheral input device according to claim 7 wherein the hinge member further comprises a third aperture adapted for receiving a control pad protrusion and a fourth aperture adapted for receiving a multiaxis input device protrusion.

9. A convertible peripheral input device according to claim 7 wherein the multiaxis input device is a joystick.

10. A convertible peripheral input device according to claim 7 wherein the multiaxis input device is a trackball.

11. A convertible peripheral input device according to claim 7 wherein the multiaxis input device is a mouse controller.

12. A convertible peripheral input device according to claim 7 wherein the hinge member further comprises a securing device to fixedly secure the hinge member to the control pad lower surface.

13. A convertible peripheral input device which comprises:

a) a control pad with an upper and lower surface and left and right edges, the lower surface having a recessed portion and two raised portions having sidewalls, the sidewalls are disposed substantially perpendicular to the plane of the lower surface, each sidewall having an aperture which is slot-shaped, and each raised portion having a notch which is adjacent to and continuous with the sidewall slot-shaped aperture;

b) a multiaxis input device with an upper and a lower surface, the lower surface having a recessed portion;

c) a hinge member with two protrusions adapted for insertion into the control pad sidewall apertures and the notches on the raised portions of the control pad lower surface, the hinge member being further rotatably secured in the recessed portion of the multiaxis input device lower surface;

wherein the hinge member is selectively and rotatably disposed between the control pad and the multiaxis input device such that the multiaxis input device can be rotated from a position adjacent the control pad right edge to a position adjacent the control pad left edge.

14. A convertible peripheral input device according to claim 13 wherein the multiaxis input device is a joystick.

15. A convertible peripheral input device according to claim 13 wherein the multiaxis input device is a trackball.

16. A convertible peripheral input device according to claim 13 wherein the multiaxis input device is a mouse controller.

17. A convertible peripheral input device according to claim 13 wherein the hinge member further comprises a securing device to fixedly secure the hinge member to the control pad lower surface.

18. A convertible peripheral input device according to claim 13 wherein the hinge member protrusion comprises a cylindrical portion and a tab portion.

* * * * *